(12) United States Patent
Reul et al.

(10) Patent No.: US 10,858,875 B2
(45) Date of Patent: Dec. 8, 2020

(54) ASSEMBLY HAVING A WINDOW SUPPORT FOR A VEHICLE WINDOW

(71) Applicant: SAINT-GOBAIN GLASS FRANCE, Courbevoie (FR)

(72) Inventors: Bernhard Reul, Herzogenrath (DE); Katja Werner, Geilenkirchen (DE); Marcel Klein, Baesweiler (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 58 days.

(21) Appl. No.: 15/749,104

(22) PCT Filed: Aug. 15, 2016

(86) PCT No.: PCT/EP2016/069318
§ 371 (c)(1),
(2) Date: Jan. 30, 2018

(87) PCT Pub. No.: WO2017/023253
PCT Pub. Date: Feb. 23, 2017

(65) Prior Publication Data
US 2018/0222410 A1   Aug. 9, 2018

(30) Foreign Application Priority Data
Aug. 14, 2015 (EP) .................................. 15181081

(51) Int. Cl.
*E05F 15/689* (2015.01)
*E05F 11/38* (2006.01)
(Continued)

(52) U.S. Cl.
CPC ............. *E05F 15/689* (2015.01); *B60J 1/17* (2013.01); *B60R 16/023* (2013.01); *B60R 16/03* (2013.01);
(Continued)

(58) Field of Classification Search
CPC ........ E05F 11/385; E05F 11/689; E05F 15/689
See application file for complete search history.

(56) References Cited

U.S. PATENT DOCUMENTS 3,529,074 A   9/1970 Lewis
5,049,892 A * 9/1991 Lindenmeier ........ H01Q 1/1271
343/701
(Continued)

FOREIGN PATENT DOCUMENTS

CN   202806307 U   3/2013
CN   104015590 A   9/2014
(Continued)

OTHER PUBLICATIONS

Written Opinion issued for International Patent Application PCT/EP2016/069318, filed Aug. 15, 2016 in the name of Saint-Gobain Glass France, dated Sep. 8, 2016. 12 pages (English Translation + German Original).
(Continued)

Primary Examiner — Gregory J Strimbu
(74) Attorney, Agent, or Firm — Pillsbury Winthrop Shaw Pittman LLP (57) ABSTRACT

A vehicle window has two individual panes that are bonded by an adhesive layer. A window support has a connection segment, forming a holder, for mechanically connecting to the vehicle window. An electrical contact element that is partially arranged within the holder is fastened to the window support. The electrical contact element, which has the form of a ribbon conductor, serves to electrically contact an electrical counter contact element of the vehicle window. According to one aspect, the electrical contact element is routed, from between the two individual panes, out of the vehicle window, and is fastened to a surface of the vehicle window.

4 Claims, 7 Drawing Sheets

(51) Int. Cl.

| | | |
|---|---|---|
| *B60J 1/17* | (2006.01) | |
| *B60R 16/023* | (2006.01) | |
| *B60R 16/03* | (2006.01) | |
| *E06B 7/28* | (2006.01) | |
| *H01R 12/77* | (2011.01) | |
| *H01R 33/945* | (2006.01) | |
| *E06B 3/66* | (2006.01) | |

(52) U.S. Cl.
CPC .............. *E05F 11/385* (2013.01); *E06B 7/28* (2013.01); *H01R 12/771* (2013.01); *H01R 33/945* (2013.01); *B60Y 2410/115* (2013.01); *E05Y 2400/65* (2013.01); *E06B 3/66* (2013.01)

(56) References Cited

U.S. PATENT DOCUMENTS

| | | | |
|---|---|---|---|
| 5,099,104 | A | 3/1992 | Holzer et al. |
| 5,676,562 | A | 10/1997 | Fukuda |
| 6,320,276 | B1 | 11/2001 | Sauer |
| 7,123,202 | B2 * | 10/2006 | Maeuser ............... H01Q 1/1271 343/713 |
| 9,399,387 | B2 | 7/2016 | Kuhnen et al. |
| 2010/0212959 | A1 | 8/2010 | Flick |
| 2013/0062119 | A1 | 3/2013 | Schlarb et al. |
| 2014/0238967 | A1 | 8/2014 | Boyce et al. |
| 2014/0247473 | A1 | 9/2014 | Kuhnen et al. |
| 2014/0251975 | A1 * | 9/2014 | Fawcett .................. H05B 3/86 219/203 |

FOREIGN PATENT DOCUMENTS

| | | |
|---|---|---|
| DE | 1923311 A1 | 11/1969 |
| DE | 4011541 A1 | 10/1991 |
| DE | 10328929 A1 | 1/2005 |
| DE | 102007046320 A1 | 4/2009 |
| DE | 102013003532 A1 | 9/2014 |
| DE | 102013003533 A1 | 9/2014 |
| EP | 2801689 A1 | 11/2014 |
| JP | S615936 A | 1/1986 |
| JP | H0414622 B2 | 3/1992 |
| JP | H0575981 U | 10/1993 |
| JP | 2009277469 A | 11/2009 |
| JP | 2013530916 A | 8/2013 |

OTHER PUBLICATIONS

International Preliminary Report on Patentability issued for International Patent Application PCT/EP2016/069318, filed Aug. 15, 2016 in the name of Saint-Gobain Glass France, dated Feb. 20, 2018. 14 pages (English Translation + German Original).

First Office Action and Search Report for Chinese Application No. 201680001706.7 filed Aug. 15, 2016 on behalf of Saint-Gobain, dated Sep. 30, 2018. 7 pages. (English Only).

International Search Report for International Application No. PCT/EP2016/069318 filed Aug. 15, 2016 on behalf of Saint-Gobain Glass France, dated Sep. 8, 2016. 7 pages. (German + English Translation).

* cited by examiner

Fig.7

ASSEMBLY HAVING A WINDOW SUPPORT FOR A VEHICLE WINDOW

CROSS-REFERENCE TO RELATED APPLICATIONS

The present application is the U.S. National Stage of International Patent Application No. PCT/EP2016/069318 filed on Aug. 15, 2016 which, in turn, claims priority to European Patent Application No. 15181081.9 filed on Aug. 14, 2015.

FIELD

The invention relates to an assembly having a window support for a vehicle window, in particular for a lowerable side window of a vehicle door.

BACKGROUND

Vehicle windows increasingly have electrical devices. For example, vehicle windows are provided with pane heating, antennas for radio and/or GPS, safety equipment, or devices for generating visually perceivable images. The electrical devices are usually applied directly on the vehicle window in a separate layer during the production process of the vehicle windows. In the composite panes customarily provided in motor vehicles, it is possible for the electrical devices to be embedded in the composite panes.

For connecting the electrical devices, for example, to the electrical power supply of a motor vehicle, the electrical device is provided with an electrical connector. The electrical connector is customarily formed by a ribbon conductor applied to or embedded in the vehicle window with a plug element arranged on its end. Usually, the flat-band connector protrudes out of the vehicle window beyond a longitudinal section such that the plug element can be connected, at a distance from the vehicle window, to an associated socket element of an electrical supply line of the vehicle.

With vehicle windows that are, for example, used as a lowerable side window of a vehicle door, the ribbon conductor protruding from the vehicle window is kept relatively long to give adequate room for movement for lowering in the installed state of the vehicle window and to avoid unwanted cable tightening during the lowering movement.

In practice, it has been shown that the ribbon conductor protruding from the vehicle window complicates installation of the vehicle window, for example, in a vehicle door and poor placement of the ribbon conductor causes the ribbon conductor to end up in the zone to be kept free for movement of the vehicle window. As a result, damage to the ribbon conductor and/or detachment of the electrical connection can occur due to the lowering motion of the vehicle window.

Moreover, it has been shown in practice that the ribbon conductor protruding from the vehicle window is troublesome in the production of the vehicle window. Also, during production of the vehicle window, the protruding ribbon conductor and/or a plug/socket element attached thereto can easily be damaged. Besides that, damage to the ribbon conductor is also possible during transport of the vehicle window.

The German patent application DE 10 2013 003533 A1 presents an assembly with a window support for a vehicle window, in which contacts of an electrically conductive layer for contacting counter contacts of a pane holder are guided by means of perforations of an individual pane on the surface of the vehicle window. Disadvantageous in this design is the necessity of providing corresponding perforations in the vehicle window, which is associated with corresponding costs and a relatively high rejection rate.

Other prior art can be found in the publications DE 10 2013 003532 A1, DE 103 28 929 A1, and EP 2 801 689 A1.

SUMMARY

In contrast, the object of the invention consists in avoiding the disadvantages of prior art assemblies mentioned in the introduction with a window support for vehicle window.

This and other objects are accomplished according to the proposal of the invention by an assembly in accordance with the disclosure. Advantageous embodiments of the invention emerge from the disclosure.

The present invention presents an assembly that comprises a vehicle window that is implemented in the form of a composite pane and has two (individual) panes fixedly bonded to one another by an adhesive layer. The vehicle window can be a lowerable side window of a vehicle door. The assembly further includes a window support for the vehicle window. The window support has a connection segment for mechanically connecting the vehicle window, which forms a holder for the vehicle window. In addition, the window support has at least one electrical contact element that is fastened to the window support (i.e., attached) and is arranged at least partially within the holder. The electrical contact element of the window support serves to electrically contact an electrical counter contact element of the vehicle window. The electrical counter contact element is implemented in the form of a ribbon conductor, for example, a flat-band cable that is routed out of the vehicle window between the two individual panes and is fastened to a surface of the vehicle window. As distinguished from the solutions known in the prior art, in particular the German patent DE 10 2013 003533 A1, mentioned in the introduction, damage to the individual panes through the formation of perforations can advantageously be avoided. The ribbon conductor can, in a simple and economical manner, be routed out between the two individual panes on the edge of the composite pane and attached to a surface of the vehicle window. The rejection rate with the industrial series production of assemblies according to the invention can advantageously be kept low.

The counter contact element of the vehicle window serves for the contacting of an electrical device of the vehicle window, which is, for example, embedded in the composite pane. It is, however, also conceivable for the electrical device to be laminated onto the surface of the composite pane with a film or applied by coating such that the composite pane has an additional layer with the electrical device.

In the assembly according to the invention, the window support is used for the electrical connection of an electrical device of the vehicle window, for example, in order to be able to then produce, starting from the window support, an electrical connection to the electrical power supply or the vehicle's electrical system. Thus, the window support additionally assumes, besides its mechanical function as a support for the vehicle window, a function for producing an electrical connection to an electrical device of a vehicle window.

By means of the electrical contact element of the window support, strain relief for the electrical connection is advantageously realised with regard to the vehicle window. In addition, by means of the electrical contact element on the window support, an electrical contacting directly with the counter contact element mounted on the vehicle window can be realised without requiring a connecting line for this. Through the arrangement of the ribbon conductor on the vehicle window, it is possible to produce electrical contacting in a simple manner with the window support when the vehicle window is mounted on the window support. Moreover, a simplification during transport of the vehicle windows as well as during their production results, for example, since it is possible to dispense with increased vigilance due to a protruding ribbon conductor. Also, possible noise due to vibration of loose cables during vehicle operation is counteracted. Thus, by means of the invention, all drawbacks that result in particular from a ribbon conductor protruding from the vehicle window with possible plug elements or socket elements connected are eliminated.

According to an advantageous embodiment of the invention, provision is made for the electrical contact element to be fastened to the window support such that upon mechanical connection of the vehicle window to the connection segment, the electrical contact element automatically comes into electrical contact against the counter contact element of the vehicle window. Thus, electrical contacting between the vehicle window and the window support is realised in a technically simple manner because by means of the fastening of the vehicle window to the window support, the desired electrical contacting of the contact element with the counter contact element occurs at the same time, without requiring additional line connections or work steps.

According to the invention, the connection segment forms a holder for the vehicle window and the electrical contact element is arranged at least partially within the holder. The holder thus assumes a dual function. First, the holder serves for the mechanical connection of the vehicle window to the window support. Second, the holder assumes a function with regard to producing the electrical contact between the electrical contact element of the window support and the electrical counter contact element of the vehicle window. Since the electrical contact element is arranged at least partially within the holder, by means of the mechanical connection of the vehicle window, electrical contact between the electrical contact elements of the vehicle window and window support occurs at the same time in a technically simple manner.

Particularly advantageously, the holder is implemented in the form of a plug-in receptacle such that the vehicle window can be mechanically connected in a technically simple manner by plugging into the holder. Thus, there is a stable and durable connection of the vehicle window to the window support. The holder can, for example, be realised as a two-legged profile, for instance, as a profile with a U-shaped cross-section, of the window support. With a U-shaped holder, the electrical contact element can be arranged, in particular implemented, on at least one of the side walls and/or on the base section of the U-shaped holder. Thus, it is technically simple to produce electrical contacting between the vehicle window and its window support, solely by plugging the vehicle window into the holder.

Since the electrical contact element is arranged at least partially within the holder, in the installed state of the vehicle window on the window support, the electrical contacting is protected from the outside against mechanical influences. This also introduces a measure for protecting the electrical contacting against possible moisture in a simple manner. By insertion of the vehicle window into the holder, a connection segment sealed toward the outside and a protective region toward the outside against mechanical intrusions are realised or can be realised in a simple manner.

These advantages are also realised when, according to an embodiment of the invention, the window support, in particular the connection segment, is implemented, at least partially as an enclosure for the electrical connection, in particular an enclosure sealing against the outside.

It is advisable for the electrical contact element of the window support to be implemented as a flat part, in particular as a ribbon conductor. Thus, the window support can be provided with the electrical contact element without necessitating enlargement of the window support assembly. At the same time, this makes it possible, in a simple manner, to arrange the electrical contact element in the region or within a holder that serves for the connection of the vehicle window.

It is further advisable for the electrical contact element to be at least partially molded into the window support, for example, into a wall of the window support. For this purpose, provision can be made that the window support be made of or include plastic. For example, the electrical contact element can be overmolded with the plastic. Thus, the electrical contact element can be implemented on the window support, in particular integrated therein in a simple manner. Separate connecting means, such as screws, rivets can be avoided.

The electrical contact element can also be fixed on the window support by clamping, gluing, and/or other force-locking, materially-bonded, and/or positive connection.

According to another advantageous embodiment of the invention, provision is made for the window support, in particular the connection segment, to have an electrical connector that can be or is electrically connected to the electrical contact element, to which at least one electrical supply line, in particular an electrical power supply line and/or an electrical signal line can be connected. Thus, the window support forms the electrical connector for the electrical power supply of the electrical device of the vehicle window. Possible assembly forces thus act against the electrical connector on the window support such that the electrical line routing to the vehicle window or an electrical contact on the vehicle window is protected in advance against any damage.

The window support can be specifically dimensioned in the region of the electrical connector such that even high effective forces, for example, forces from the electrical supply line or otherwise acting on the electrical connector can be withstood and possible damage to or disconnection of the electrical contact is prevented.

According to another advantageous embodiment of the invention, provision can be made for the electrical connector to have or be formed by at least one clamp, snap, pushbutton, or like electrical connection element to which the electrical supply line can be electrically connected. By this measure, a robust and durable electrical connection to the window support is realised.

According to another advantageous embodiment of the invention, provision can be made for the electrical connector to have an electrical connection line, for example, a ribbon conductor, that is electrically connected to the electrical contact element of the window support. Thus, electrical contact can be realised, for example, with the electrical supply line or an electrical supply line, which terminates at a distance from the window support. The electrical connection line of the window support, which can be routed to the supply line, serves to bridge this distance in order to produce electrical contact, for example, via a socket-plug connection. For this purpose, it is advisable for the electrical connector to also have a plug or a socket which is provided on the free end of the electrical connection line. It is conceivable for the electrical contact element of the window support to be formed by the electrical connection line, for example, a ribbon conductor.

The plug or the socket of the electrical connector of the window support can, in particular, be arranged at a distance from the window support. For example, the electrical connection line can be routed out of an insertion opening of the holder for the vehicle window.

Another advantageous embodiment of the invention can consist in that the connection line is at least partially surrounded on one end by a housing that is detachably inserted into a material recess on the connection segment. This makes possible the replacement of the connection line in a simple manner, for example, to exchange the connection line for a connection line with a different length. Also, prior art window supports can be retrofitted in a simple manner. The electrical contact of the connection line is protected against external mechanical influences and/or moisture by the housing.

In a particularly advantageous embodiment of the invention, the electrical counter contact element extends over at least one section of an edge region of the vehicle window. Such a measure favours the attachment of the ribbon conductor, which is guided out of the composite pane, to the surface of the vehicle window as well as installation of the vehicle window on the window support, in particular if the holder is implemented in the form of a plug-in holder for the vehicle window.

In a particularly advantageous manner, the electrical counter contact element is positioned on the vehicle window such that in the installation position on the window support, the counter contact element forms an electrical contact with the contact element of the window support.

A stable and durable connection of the counter contact element on the vehicle window is realised when the counter contact element is fastened to at least one of the surface sides of the vehicle window. The counter contact element can be attached on the vehicle window, for example, by gluing. Thus, the counter contact element can be fastened to the vehicle window in a technically simple manner.

The invention further extends to a vehicle with the above-described assembly.

Additional objectives, advantages, features, and application possibilities of the present invention emerge from the following description of multiple exemplary embodiments. All features described and/or illustrated per se or in any logical combination constitute the subject matter of the present invention, irrespective of their summary in the claims or back reference.

BRIEF DESCRIPTION OF THE DRAWINGS

They depict.

DETAILED DESCRIPTION OF THE DISCLOSURE

Figure 1:
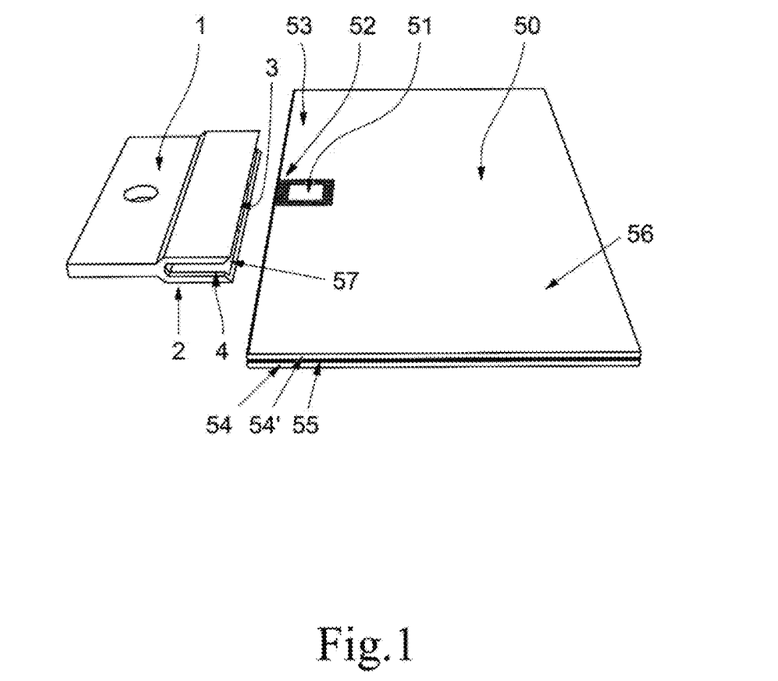
FIG. 1 an embodiment of an assembly according to the invention with a window support and an associated vehicle window in an exploded view, FIG. 2 the assembly of FIG. 1 in a perspective view, FIG. 3 another embodiment of an assembly according to the invention with a window support and an associated vehicle window in a perspective view, FIG. 4 another embodiment of an assembly according to the invention with a window support and a vehicle window in a perspective view, FIG. 5 an electrical supply line with a two-part plug in an exploded view, FIG. 6 the electrical supply line with the plug of FIG. 5 in the installed state on an assembly with a window support and an associated vehicle window in a perspective view.
Figure 2:
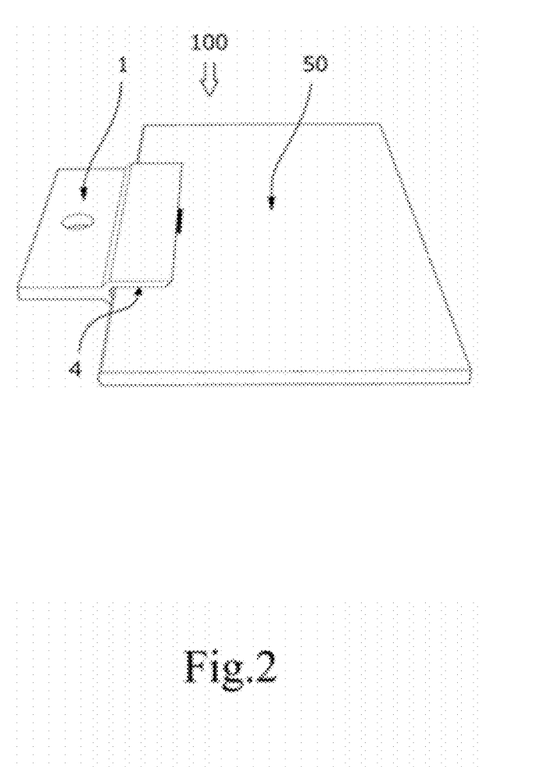

FIGS. 1 and 2 depict schematically an embodiment of an assembly 100 with a window support 1 and a vehicle window 50. FIG. 1 depicts the window support 1 and the vehicle window 50 separated from one another, whereas, in contrast, in FIG. 2 the window support 1 and the vehicle window 50 are assembled and the assembly 100 is formed. The vehicle window 50 can be lowerable side window of a vehicle door. In this case, the vehicle window 50 is moved jointly together with the window support 1, in particular lowered jointly.

The vehicle window 50 is a composite pane, which comprises two (individual) panes 54, 54', which are fixedly bonded to one another by an adhesive layer 55. The structure of a composite pane is well known to the person skilled in the art such that it is unnecessary to present this in greater detail in FIGS. 1 and 2.

The window support 1 has a connection segment 2, by means of which the vehicle window 50 is connected to the window support 1. The connection segment 2 is implemented as holder 4, which—as depicted—can, in particular, be implemented as a plug-in receptacle, which is, for example, U-shaped in cross-section.

The vehicle window 50 is plugged into the holder 4 with one end or end region, by which means the mechanical connection between the vehicle window 50 and the window support 1 is produced.

The vehicle window 50 is associated with an electrical device (not shown in FIGS. 1 and 2). The electrical device can be part of a separate layer that is applied to the vehicle window 50, or can even be embedded in the composite pane.

In order to be able to connect the electrical device (not shown in FIGS. 1 and 2) to an electrical energy supply and/or an electrical control device for controlling the electrical device, the vehicle window 50 has an electrical counter contact element 51 that is electrically connected to the electrical device and can, for example, be arranged in a section 52 of an edge region 53 of the vehicle window 50, which is or will be inserted into the holder 4 of the window support 1. Preferably, the electrical counter contact element 51 extends at least partially over the section 52 of the edge region 53.

Figure 7:
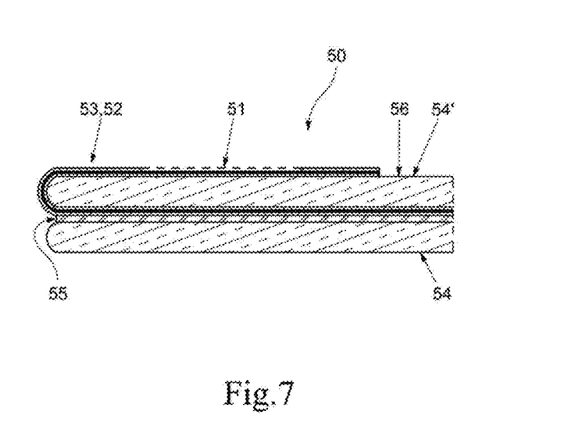
FIG. 7 the assembly of FIG. 1 in a cross-sectional view.

The counter contact element 51 is implemented in the form of a ribbon conductor, which is routed out of the composite pane between the two individual panes 54, 54' in the edge region and is fastened, for example, by gluing, to a surface 56, i.e., surface side, of the vehicle window 50, as also shown in FIG. 7.

The window support 1 has, correspondingly, an electrical contact element 3, in order to form an electrical contact, by means of the electrical counter contact element 51 of the vehicle window 50.

The electrical contact element 3 of the window support 1 is preferably arranged in the region of the holder 4, for example, on one of the side walls of the holder 4 and/or on the base of the holder 4 such that by insertion of the vehicle window 50 into the holder 4 of the window support 1, an electrical contact between the electrical contact elements 3 and 51 is (automatically) produced at the same time. By means of the assembly 100, the electrical device (not shown in FIGS. 1 and 2) can be connected to an electrical power supply network, for example, the vehicle's electrical system, without requiring a separate outward cable on the vehicle window 50 for this.

Figure 3:
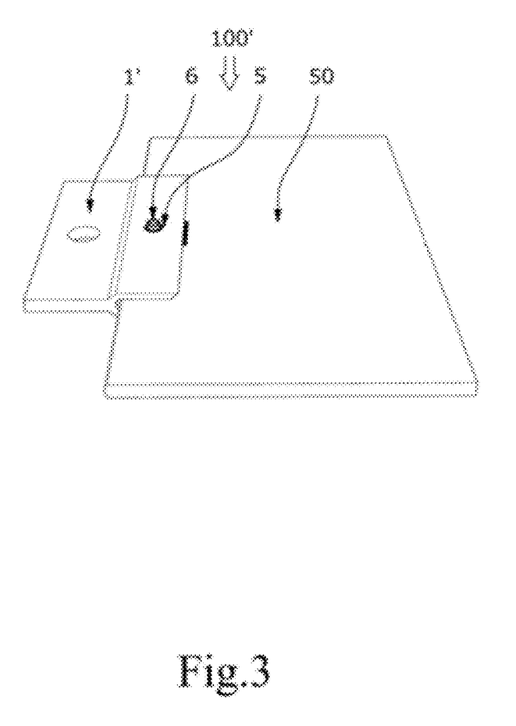

FIG. 3 depicts another embodiment of an assembly 100' width a window support 1' and an associated vehicle window, which can be the vehicle window 50 already described in FIGS. 1 and 2. The assembly 100' of FIG. 3 differs from the assembly 100 of FIGS. 1 and 2 among other things, in that the window support 1' is provided an electrical connection 5, which can be formed by a pushbutton 6, a snap, a clamp, or like connection element or can contain such a component. An electrical supply line (not shown in FIG. 3) can be connected thereto. The electrical supply line can be an electrical power supply line, for example, of the electrical system of a motor vehicle. Additionally or alternatively, the electrical supply line can also be an electrical signal line, for example, to direct appropriate control signals to the electrical device.

Figure 4:
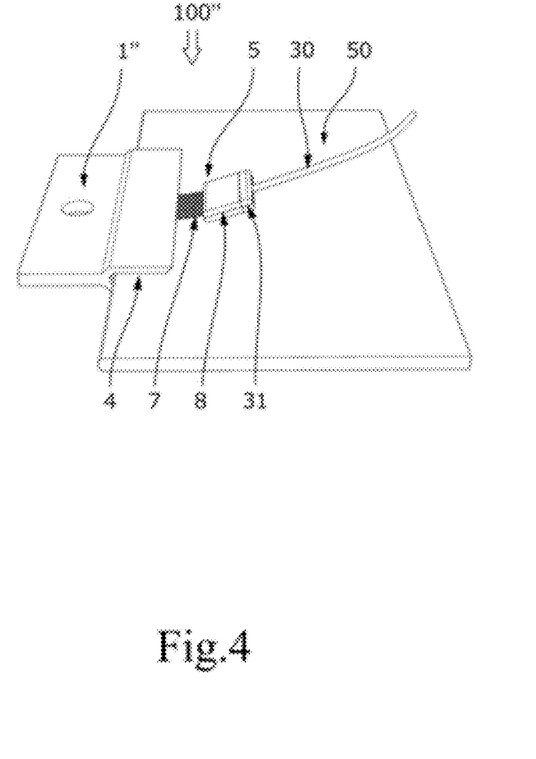

FIG. 4 depicts another possible embodiment of an assembly 100" with a window support 1" and a vehicle window, which can be the vehicle window 50. The assembly 100" differs from the assembly 100' of FIG. 3 among other things, in that, there, the electrical connector 5 provided with the assembly 100" is formed by a socket 8 and an electrical connection line 7, which is, in turn, electrically connected to the electrical contact element 3 of the window support 1. For example, the electrical connection line 7 is implemented as a ribbon conductor and protrudes outward out of the insertion opening 57 of the holder 4 of the vehicle window 50, with the socket 8 electrically connected to a plug 31 of an electrical supply line 30.

Figure 5:
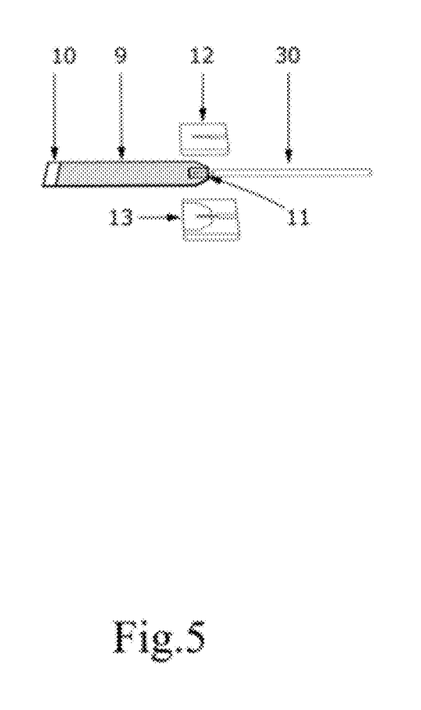
Figure 6:
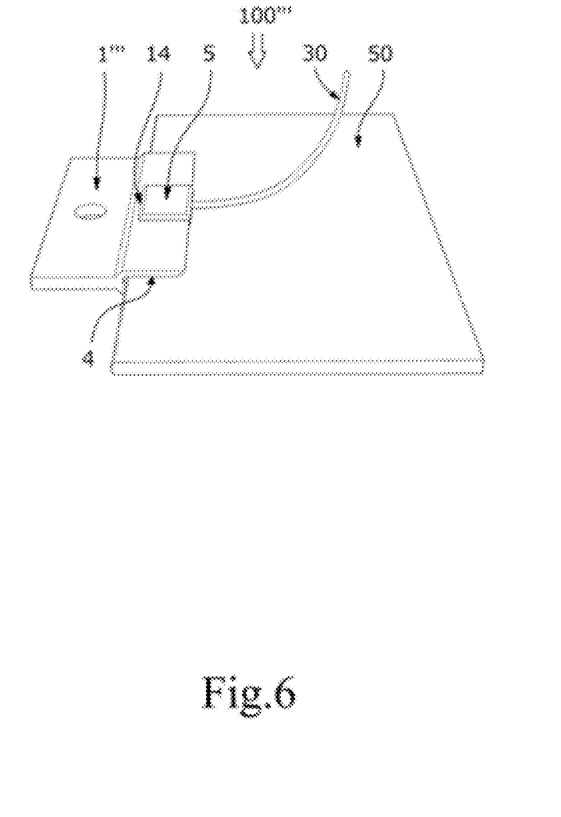

FIG. 5 depicts components of an assembly 100''' with a window support 1''' and a vehicle window, which can be the vehicle window 50. The assembly 100''' is depicted in FIG. 6. The components shown in FIG. 5 relate to an electrical connection line 9 with electrical contacts 10 and 11 arranged on the ends. The electrical contact 11 is surrounded by a preferably two-part housing, whose housing parts 12 and 13 protect the electrical contact against mechanical forces and/or seal against moisture from the outside.

The housing parts 12 and 13 are provided in the assembled state with the electrical connection line 9 for the purpose, for example, of being installed in a recess of a wall of the holder 4 of the window support 1. For example, the recess can be implemented as a plug-in receptacle into which the housing formed by the housing parts 12 and 13 is inserted and thus the electrical contact element 3 of the window support 1''' is formed thereby. The recess in the wall of the holder 4 is indicated in FIG. 6 by the section 14. The electrical connection line 9 of FIG. 5 is then connected to the electrical connection line 30, which is merely indicated in FIG. 6.

LIST OF REFERENCE CHARACTERS 1 window support
1' window support
1" window support
1'" window support
2 connection segment
3 electrical contact element
4 holder
5 electrical connector
6 pushbutton
7 electrical connection line
8 socket
9 electrical connection line
10 electrical contact
11 electrical contact
12 housing part
13 housing part
14 section of 4 (recess)
30 electrical supply line
31 plug
50 vehicle window
51 electrical counter contact element
52 section
53 edge region
54 individual pane
54' individual pane
55 adhesive layer
56 surface
57 insertion opening
100 assembly
100' assembly
100" assembly
100'" assembly

The invention claimed is:

1. An assembly, comprising:
  a vehicle window having a surface side and comprising two individual panes bonded to each other by an adhesive layer and the vehicle window further having an electrical counter contact element arranged on an edge region thereof;
  a support for the vehicle window, comprising a connection segment for mechanical connection of the support to the vehicle window, the connection segment comprising a holder for the vehicle window and a support electrical contact element fastened to the support and at least partially arranged within the connection segment, the holder comprising side walls configured to provide the mechanical connection of the support to the vehicle window; and
  an electrical connector comprising an electrical connection line electrically connectable to the support electrical contact element, the electrical connector being configured for connection to at least one electrical supply line, the electrical connection line being at least partially surrounded at one end by a housing that is detachably insertable into a recess in one of the side walls of the holder of the connection segment,
    wherein the support electrical contact element is configured to engage an electrical contact of the electrical connection line and the support electrical contact element is further configured to contactingly engage the electrical counter contact element arranged on the edge region of the window automatically upon the mechanical connection of the vehicle window to the support.

2. The assembly according to claim 1, wherein the connection segment is, at least in part, an enclosure for the electrical connector.

3. The assembly according to claim 2, wherein the enclosure is an outwardly sealed enclosure.

4. A motor vehicle, comprising:
  the assembly according to claim 1.

* * * * *